US012229068B1

(12) United States Patent
Cai et al.

(10) Patent No.: US 12,229,068 B1
(45) Date of Patent: Feb. 18, 2025

(54) MULTI-DESTINATION DMA FOR PACKET BROADCAST

(71) Applicant: F5, Inc., Seattle, WA (US)

(72) Inventors: Hao Cai, Sammamish, WA (US); Timothy S. Michels, Greenacres, WA (US); Daniel J. McDermott, Spokane Valley, WA (US); David Ryan, Westford, MA (US)

(73) Assignee: FS, Inc., Seattle, WA (US)

( * ) Notice: Subject to any disclaimer, the term of this patent is extended or adjusted under 35 U.S.C. 154(b) by 0 days.

(21) Appl. No.: 17/696,201

(22) Filed: Mar. 16, 2022

(51) Int. Cl.
*G06F 13/40* (2006.01)
*G06F 13/28* (2006.01)
*G06F 13/38* (2006.01)
*H04L 45/16* (2022.01)

(52) U.S. Cl.
CPC .......... *G06F 13/4022* (2013.01); *G06F 13/28* (2013.01); *G06F 13/385* (2013.01); *H04L 45/16* (2013.01); *G06F 2213/3808* (2013.01)

(58) Field of Classification Search
CPC ..... H04L 45/16; G06F 13/4022; G06F 13/28; G06F 13/385; G06F 2213/3808
See application file for complete search history.

(56) References Cited

U.S. PATENT DOCUMENTS

| 8,117,356 | B1* | 2/2012 | Narad | G06F 13/28 |
| | | | | 710/22 |
| 9,996,491 | B2* | 6/2018 | Crupnicoff | G06F 13/36 |
| 11,467,998 | B1* | 10/2022 | Izenberg | G06F 15/7807 |
| 2019/0297015 | A1* | 9/2019 | Marolia | H04L 45/742 |
| 2022/0092408 | A1* | 3/2022 | Khaitan | G06N 20/00 |
| 2022/0197831 | A1* | 6/2022 | Gorodetsky | H04L 45/28 |
| 2022/0414028 | A1* | 12/2022 | Pope | G11C 7/1069 |

\* cited by examiner

*Primary Examiner* — Henry Tsai
*Assistant Examiner* — Aurangzeb Hassan
(74) *Attorney, Agent, or Firm* — Troutman Pepper Locke LLP

(57) ABSTRACT

Technology related to broadcast packet direct memory access (DMA) operations is disclosed. When a network interface controller (NIC) connected to a host computer receives a broadcast packet, it can transmit a request to an agent process running on the host computer for a plurality of destination buffers. In some embodiments, the request to the agent comprises all or part of the packet, or metadata about the packet. In such embodiments, the agent can use the contents of the request to identify services that should receive the packet. Alternatively, the NIC can identify the destination services and can transmit identifiers for the destination services to the agent. The agent can transmit requests for memory buffers to the services and can receive memory location identifiers in response. The agent can transmit the identifiers to the NIC, which can perform multiple DMA operations to write the broadcast packet to the identified memory locations.

20 Claims, 9 Drawing Sheets

MULTI-DESTINATION DMA FOR PACKET BROADCAST

FIELD

This technology generally relates to network traffic management, and more specifically to managing network traffic for multiple services running on a computing device.

BACKGROUND

Recently, servers have been expanded to execute multiple services, such as multiple virtual servers running on shared hardware in a cloud computing environment. In some scenarios, the multiple services can be isolated from one another using virtual machines and/or virtualization containers. Current network interface controller (NIC) devices present themselves as single monolithic devices to system software. Such NIC devices may be managed by a single device driver that communicates with the multiple services running on the server via virtual NIC interfaces.

BRIEF SUMMARY

In an example embodiment, a method that is implemented by a network traffic management system comprises: receiving a network packet at a hardware network interface controller (NIC) connected to a host computer; transmitting, by the hardware NIC, metadata about the network packet to an agent process running on the host computer; receiving a response message at the hardware NIC from the agent process that comprises a memory location identifier; and writing, by the hardware NIC, the network packet to a memory location of the host computer that is associated with the memory location identifier, wherein the writing comprises performing a direct memory access (DMA) operation.

In another example embodiment, a system comprises one or more network traffic management modules, networking modules, or server modules, memory comprising programmed instructions stored thereon, and one or more processors configured to be capable of executing the stored programmed instructions to: receive a network packet at a hardware network interface controller (NIC) connected to a host computer; transmit, by the hardware NIC, metadata about the network packet to an agent process running on the host computer; receive a response message at the hardware NIC from the agent process that comprises a memory location identifier; and write, by the hardware NIC, the network packet to a memory location of the host computer that is associated with the memory location identifier, wherein the writing comprises performing a direct memory access (DMA) operation.

In another example embodiment, a non-transitory computer readable medium has instructions stored thereon that comprise executable code that, when executed by one or more processors, causes the processors to: receive a network packet at a hardware network interface controller (NIC) connected to a host computer; transmit, by the hardware NIC, metadata about the network packet to an agent process running on the host computer; receive a response message at the hardware NIC from the agent process that comprises a memory location identifier; and write, by the hardware NIC, the network packet to a memory location of the host computer that is associated with the memory location identifier, wherein the writing comprises performing a direct memory access (DMA) operation.

In another example embodiment, a network traffic management apparatus comprises memory comprising programmed instructions stored thereon and one or more processors configured to be capable of executing the stored programmed instructions to: receive a network packet at a hardware network interface controller (NIC) connected to a host computer; transmit, by the hardware NIC, metadata about the network packet to an agent process running on the host computer; receive a response message at the hardware NIC from the agent process that comprises a memory location identifier; and write, by the hardware NIC, the network packet to a memory location of the host computer that is associated with the memory location identifier, wherein the writing comprises performing a direct memory access (DMA) operation.

In another example embodiment, a method that is implemented by a network traffic management system comprises: receiving metadata about a network packet by an agent process running on a host computer, wherein the metadata about the network packet is received from a hardware network interface controller (NIC) connected to the host computer; identifying, by the agent process, a memory buffer of the host computer using the metadata; transmitting a direct memory access (DMA) write message by the agent process to the hardware NIC, wherein the DMA write message comprises a memory location identifier associated with the memory buffer; and receiving, by the agent process, a notification message from the hardware NIC indicating that the hardware NIC has performed a DMA operation to write the network packet to the memory buffer of the host computer.

In another example embodiment, a system comprises one or more network traffic management modules, networking modules, or server modules, memory comprising programmed instructions stored thereon, and one or more processors configured to be capable of executing the stored programmed instructions to: receive metadata about a network packet by an agent process running on a host computer, wherein the metadata about the network packet is received from a hardware network interface controller (NIC) connected to the host computer; identify, by the agent process, a memory buffer of the host computer using the metadata; transmit a direct memory access (DMA) write message by the agent process to the hardware NIC, wherein the DMA write message comprises a memory location identifier associated with the memory buffer; and receive, by the agent process, a notification message from the hardware NIC indicating that the hardware NIC has performed a DMA operation to write the network packet to the memory buffer of the host computer.

In another example embodiment, a non-transitory computer readable medium has instructions stored thereon comprising executable code that, when executed by one or more processors, causes the processors to: receive metadata about a network packet by an agent process running on a host computer, wherein the metadata about the network packet is received from a hardware network interface controller (NIC) connected to the host computer; identify, by the agent process, a memory buffer of the host computer using the metadata; transmit a direct memory access (DMA) write message by the agent process to the hardware NIC, wherein the DMA write message comprises a memory location identifier associated with the memory buffer; and receive, by the agent process, a notification message from the hardware NIC indicating that the hardware NIC has performed a DMA operation to write the network packet to the memory buffer of the host computer.

In another example embodiment, a network traffic management apparatus comprises memory comprising programmed instructions stored thereon and one or more processors configured to be capable of executing the stored programmed instructions to: receive metadata about a network packet by an agent process running on a host computer, wherein the metadata about the network packet is received from a hardware network interface controller (NIC) connected to the host computer; identify, by the agent process, a memory buffer of the host computer using the metadata; transmit a direct memory access (DMA) write message by the agent process to the hardware NIC, wherein the DMA write message comprises a memory location identifier associated with the memory buffer; and receive, by the agent process, a notification message from the hardware NIC indicating that the hardware NIC has performed a DMA operation to write the network packet to the memory buffer of the host computer.

In another example embodiment, a method implemented by a network traffic management system comprises: receiving a network broadcast packet by a hardware network interface controller (NIC) connected to a host computer; transmitting, by the hardware NIC, a request to an agent process running on the host computer to identify a plurality of memory locations in the host computer that should receive the network broadcast packet; receiving, by the hardware NIC, a response from the agent process that comprises a plurality of memory location identifiers associated with the plurality of memory locations; and writing, by the hardware NIC, the network broadcast packet to the plurality of memory locations in the host computer that are associated with the plurality of memory location identifiers, wherein the writing comprises performing a plurality of direct memory access (DMA) operations.

In another example embodiment, a system comprises one or more network traffic management modules, networking modules, or server modules, memory comprising programmed instructions stored thereon, and one or more processors configured to be capable of executing the stored programmed instructions to: receive a network broadcast packet by a hardware network interface controller (NIC) connected to a host computer; transmit, by the hardware NIC, a request to an agent process running on the host computer to identify a plurality of memory locations in the host computer that should receive the network broadcast packet; receive, by the hardware NIC, a response from the agent process that comprises a plurality of memory location identifiers associated with the plurality of memory locations; and write, by the hardware NIC, the network broadcast packet to the plurality of memory locations in the host computer that are associated with the plurality of memory location identifiers, wherein the writing comprises performing a plurality of direct memory access (DMA) operations.

In another example embodiment, a non-transitory computer readable medium has instructions stored thereon comprising executable code that, when executed by one or more processors, causes the processors to: receive a network broadcast packet by a hardware network interface controller (NIC) connected to a host computer; transmit, by the hardware NIC, a request to an agent process running on the host computer to identify a plurality of memory locations in the host computer that should receive the network broadcast packet; receive, by the hardware NIC, a response from the agent process that comprises a plurality of memory location identifiers associated with the plurality of memory locations; and write, by the hardware NIC, the network broadcast packet to the plurality of memory locations in the host computer that are associated with the plurality of memory location identifiers, wherein the writing comprises performing a plurality of direct memory access (DMA) operations.

In another example embodiment, a network traffic management apparatus comprises memory comprising programmed instructions stored thereon and one or more processors configured to be capable of executing the stored programmed instructions to: receive a network broadcast packet by a hardware network interface controller (NIC) connected to a host computer; transmit, by the hardware NIC, a request to an agent process running on the host computer to identify a plurality of memory locations in the host computer that should receive the network broadcast packet; receive, by the hardware NIC, a response from the agent process that comprises a plurality of memory location identifiers associated with the plurality of memory locations; and write, by the hardware NIC, the network broadcast packet to the plurality of memory locations in the host computer that are associated with the plurality of memory location identifiers, wherein the writing comprises performing a plurality of direct memory access (DMA) operations.

DETAILED DESCRIPTION

Figure 1:
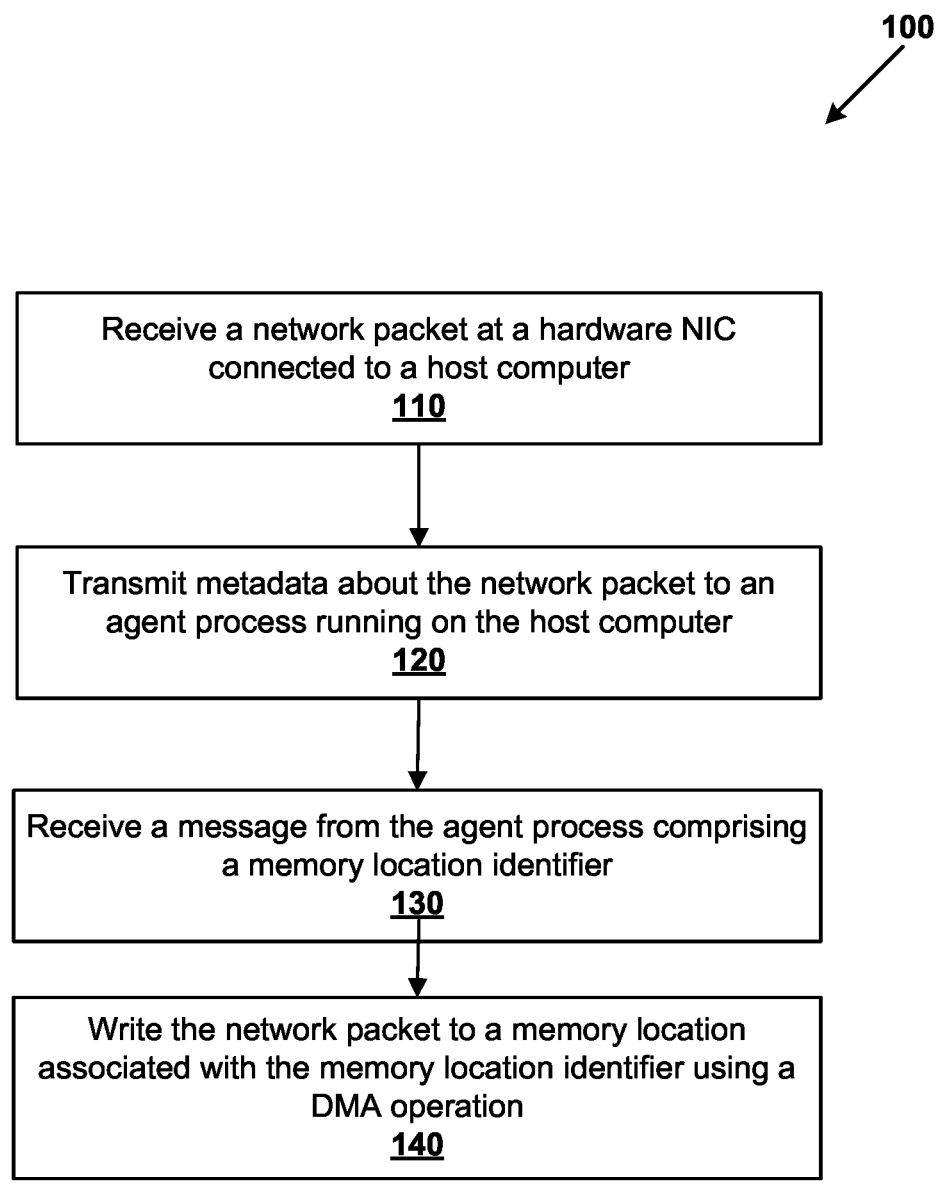
FIG. 1 is a flowchart of an example method for performing a network packet direct memory access (DMA) write operation based on network packet metadata.

In scenarios where multiple service processes are running on a server computer (such as a network traffic management apparatus), the service processes must share access to the server computer's network interface controller (NIC) device in order to communicate with other computing devices via a computer network. Various techniques can be used to manage this shared access to the NIC device. For example, the service processes can be configured to interface with an agent process (such as a driver registered with an operating system of the server computer) that manages the access of the service processes to the NIC device. The agent process can expose virtual NIC interfaces to the service processes. From the perspective of a service process, a virtual NIC interface can appear as a dedicated connection to the NIC device. However, the agent process can be aware of all the existing virtual NIC interfaces and can manage the overall flow of network packets between the NIC device and the service processes.

However, in some scenarios (such as those involving large volumes of network communication by the service processes) the agent process can become a bottleneck for the system, since each network packet may have to be copied multiple times. For example, a given network packet may have to be copied once from a NIC onboard memory to a memory region of the server computer that is accessible by the agent process. The agent process, after determining a destination service for the network packet, then may have to copy the network packet again into another memory region that is accessible by the destination service. This problem can be exacerbated in multicast scenarios, where a given network packet may have to be copied multiple times into the memory regions of multiple service processes.

At least some of the technologies described herein can be used to address these problems by enabling the NIC device to write network packets to, and read network packets from, a memory region accessible by a service process using direct memory access (DMA) operations. For example, when the NIC device receives a network packet, the NIC device can transmit a request to the agent process for a memory buffer where the network packet should be written. The agent process can determine a destination service process for the network packet and can transmit a request for a free memory buffer to a virtual NIC interface associated with the destination service process. The agent process can receive a response from the virtual NIC interface comprising a memory location identifier associated with a free memory buffer that is accessible by the destination service process. The agent process can transmit a response to the NIC device that comprises the memory location identifier. The NIC device can then perform a DMA operation to write the network packet to a memory location of the server computer associated with the memory location identifier. Thus, a copying of the network packet by the agent process to the memory region associated with the destination service process can be avoided in at least some circumstances. The DMA operation by the NIC device can, in many cases, be performed faster than a copy operation by the agent process running on the server computer. Thus, in at least some cases, the I/O throughput of the server computer can be improved.

In some embodiments, the request for a free memory buffer by the NIC device can comprise all or part of the network packet. Alternatively, the request for the free memory buffer can comprise metadata about the network packet instead of all or part of the network packet. In such an embodiment, the copy of the network packet from the NIC device memory to a memory region associated with the agent process can also be avoided.

Outbound transmission scenarios can also be supported. For example, the agent process can receive a notification from a virtual NIC interface of a service process, indicating that an outbound network packet is ready for transmission. The notification can comprise a memory location identifier associated with a memory buffer where the outbound network packet is stored. The agent process can transmit a message to the NIC device that comprises the memory location identifier and indicates that an outbound transmission is requested. The NIC device can perform a DMA operation to read the network packet from a memory location of the server computer associated with the memory location identifier and can transmit the outbound network packet via a network connection. The NIC device can transmit a notification message to the agent process after the outbound network packet has been read. The agent process can then transmit a notification to the virtual NIC interface of the service process. The service process can then free the memory buffer and/or make the memory buffer available for additional outbound network packets. In at least some embodiments, the agent process can poll the virtual NIC interface of the service process periodically to determine whether outbound network packets are ready for transmission. The notification that the outbound packet is ready for transmission can be received in response to such a polling operation.

Multicast scenarios can also be supported. For example, the NIC device can transmit a request to the agent process for a destination memory location when a network packet is received as described above. However, the agent process may determine that there are multiple service processes that should receive the network packet. In such a scenario, the agent process can transmit a request for a free memory buffer to a virtual NIC interface of each of the identified service processes. The agent process can receive a memory location identifier from each of the identified service processes and can transmit the multiple memory location identifiers to the NIC device. Upon receipt of the multiple memory location identifiers, the NIC device can perform multiple DMA operations to write the network packet into the multiple identified memory locations.

Broadcast scenarios can also be supported. For example, the NIC device can receive a network broadcast packet via a network connection. It is possible that a plurality of (but potentially less than all) service processes running on the server computer should receive the network broadcast packet. For example, a plurality of service processes running on the server computer may be part of a same virtual network. The NIC device can transmit a request to the agent process to identify the service processes that should receive the network broadcast packet. The NIC device can receive a response from the agent process that comprises a plurality of memory location identifiers. The NIC device can perform a plurality of DMA operations to write the network packet to a plurality of memory locations associated with the plurality of memory location identifiers. In some embodiments, the request to the agent process can comprise all or part of the network broadcast packet, or metadata about the network broadcast packet. In such embodiments, the agent process can use the contents of the request to identify service processes that should receive the network broadcast packet. Alternatively, the NIC device can identify the service processes that should receive the network broadcast packet. For example, the NIC device can comprise a data structure that it can use to identify the service processes that should receive the network broadcast packet. In an embodiment where the NIC device identifies the destination service processes, the request from the NIC device can comprise service identifiers associated with the destination service processes. Once the destination service processes have been identified (either by the agent process or the NIC device), the agent process can transmit requests for free memory buffers to virtual NIC interfaces of the identified service processes. The agent process can receive memory location identifiers for free memory buffers from the virtual NIC interfaces and can transmit the plurality of memory location identifiers to the NIC device. The NIC device can perform a plurality of DMA operations to write the network broadcast packet to memory locations associated with the plurality of memory location identifiers. The NIC device can transmit a notification to the agent process, indicating that the DMA write operations for the broadcast packet have been completed.

The agent process can then transmit notifications to each of the destination service processes.

FIG. 1 is a flowchart of an example method 100 for performing a network packet direct memory access (DMA) write operation based on network packet metadata. Any of the example apparatuses and systems described herein can be used to perform all or part of the example method 100. For example, the example network traffic management apparatus 210 depicted in FIG. 2 can be used to perform all or part of the example method 100.

Figure 2:
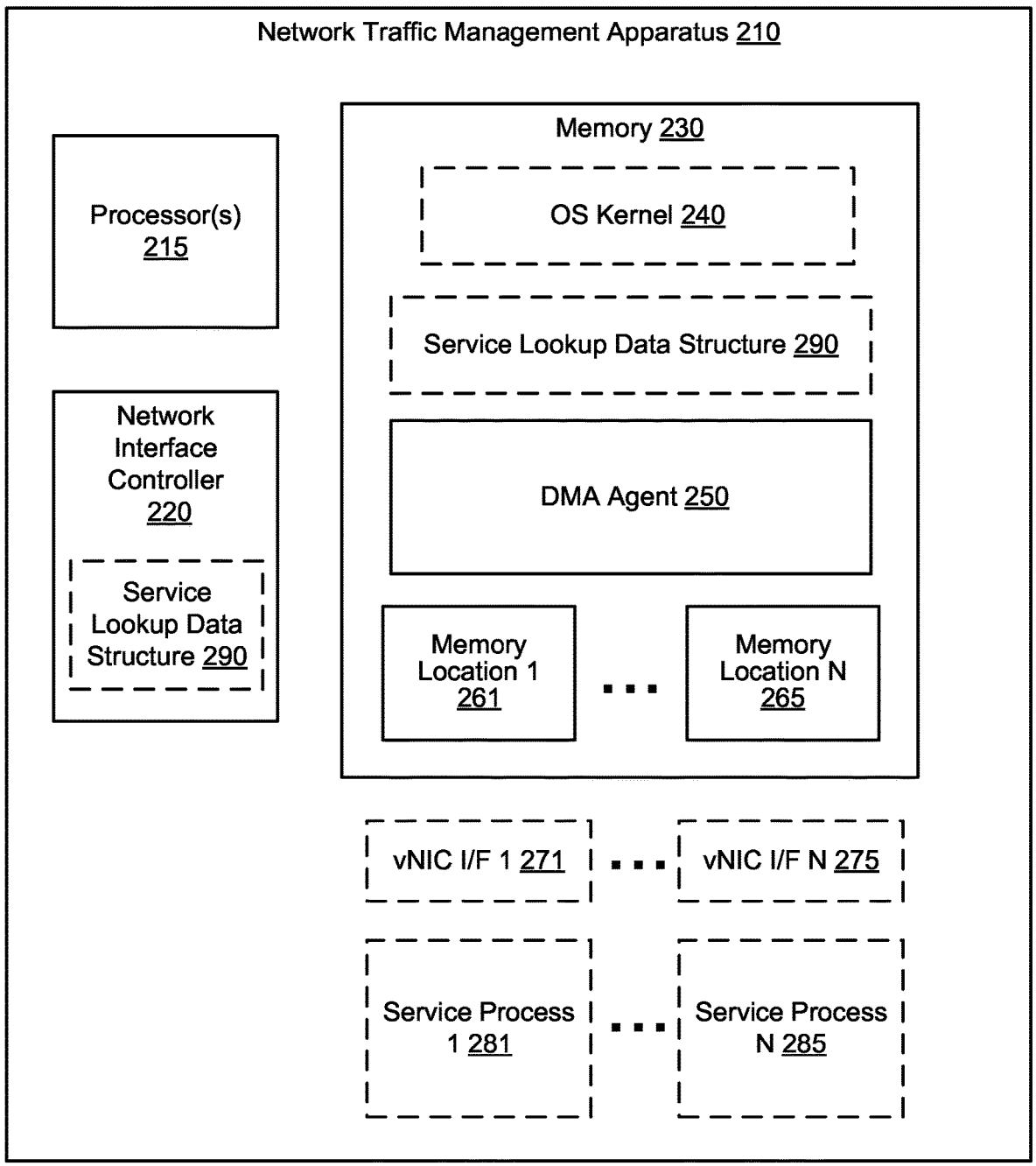
FIG. 2 is a block diagram of an example network traffic management apparatus for performing network packet DMA operations.

FIG. 2 is a block diagram of an example network traffic management apparatus 210 for performing network packet DMA operations. The example network traffic management apparatus 210 comprises one or more processors 215, a hardware network interface controller (NIC) 220, and a memory 230. The memory 230 can comprise programmed instruction stored thereon that can be executed by the one or more processors 215. The programmed instructions stored in the memory 230 comprise instructions for an agent process 250 that can be used to perform direct memory access (DMA) operations as described herein, the memory 230 can further comprise a plurality of memory locations 261-265 in which data items (such as network packets) can be stored. In at least some embodiments, the plurality of memory locations 261-265 can be targeted by DMA operations by the hardware NIC 220. In at least some such embodiments, the plurality of memory locations 261-265 can be associated with a plurality of service processes 281-285 running on the network traffic management apparatus 210. Optionally, the memory 230 can comprise instructions for an operating system kernel 240. The network traffic management apparatus 210 can be implemented using a computing environment as described in more detail with reference to FIG. 9.

Referring to FIG. 1, at 110, a network packet is received at a hardware network interface controller (NIC) connected to a host computer. For example, a network packet can be received at the hardware NIC 220 of the network traffic management apparatus 210. The network packet can be a packet that comports to one or more computer network communication standards (e.g., TCP, IP, UDP, etc.). The network packet can be received via one or more communication network channels (such as, one or more wired and/or wireless computer networks, etc.).

At 120, metadata about the network packet is transmitted by the hardware NIC to an agent process running on the host computer. For example, the hardware NIC 220 can transmit metadata about the received network packet to the agent process 250 running on the network traffic management apparatus 210. The metadata about the network packet can be generated based on contents of the network packet (such as contents of one or more headers of the network packet). In a particular embodiment, the metadata about the network packet can be based on a value of a destination header of the network packet. For example, the hardware NIC 220 can determine a destination identifier, such as an identifier for a service process (e.g., 281, 285, etc.) that should receive the network packet. Optionally, the hardware NIC can comprise one or more data structures that can be used to identify one or more destinations for the network packet based on contents of the network packet. For example, the hardware NIC 220 can comprise a service look up data structure 290 that can be used by the hardware NIC to identify a service process, of the plurality of service processes 281-285, running on the network traffic management apparatus 210.

At 130, a response message is received at the hardware NIC from the agent process that comprises a memory location identifier. For example, the network interface controller 220 can receive a response message from the agent process 250 that comprises an identifier associated with a memory location, of the plurality of memory locations 261-265.

At 140, the hardware NIC writes the network packet to a memory location of the host computer that is associated with the memory location identifier, wherein the writing comprises performing a direct memory access (DMA) operation. For example, the hardware NIC 220 can write the network packet to a memory location, of the plurality of memory locations 261-265, that is associated with the memory location identifier. The hardware NIC 220 can write the packet to the identified memory location (e.g., 261) using a DMA write operation. For example, the hardware NIC 220 can be connected via one or more DMA access channels (not shown) to the memory 230. One or more such DMA access channels can be used to write the network packet to the identified memory location.

Optionally, the hardware NIC can transmit a message to the agent process indicating that the writing of the network packet to the memory location of the host computer is complete. For example, the hardware NIC 220 can transmit a message to the agent process 250, indicating that the writing of the network packet to the memory location, of the plurality of memory locations 261-265, has been completed. The notification message can comprise a data structure that is transmitted by the hardware NIC to the agent process. This can comprise a writing of a data structure by the hardware NIC to a memory region that is accessible by the agent process. Additionally or alternatively, receiving the notification message can comprise observing a change to a data structure (such as a change to an index value) by the agent process. For example, the agent process can be configured to monitor a data structure in a shared memory region. The hardware NIC can make one or more changes to this data structure to indicate that the hardware NIC has performed the DMA operation to write the network packet to the memory location of the host computer. The agent process can then receive this notification message by observing the change(s) made by the hardware NIC to the data structure in the shared memory region.

In at least some embodiments, the response message from the agent process can comprise a plurality of memory location identifiers. In such an embodiment, writing the network packet can comprise writing the network packet to each of a plurality of memory locations associated with the plurality of memory location identifiers. Writing the network packet to the plurality of memory locations can comprise performing a plurality of DMA operations. For example, the hardware NIC 220 can perform a plurality of DMA operations to write the network packet to a plurality of memory locations, of the plurality of memory locations 261-265. In a particular example, the hardware NIC 220 can determine that the response from the agent process 250 comprises a memory location identifier associated with the memory location 261, and another memory location identifier or associated with the memory location 265. The hardware NIC 220 can then perform a first DMA operation to write the network packet to the memory location 261. The hardware NIC can then perform a second DMA operation to write the network packet to the memory location 265.

Figure 3:
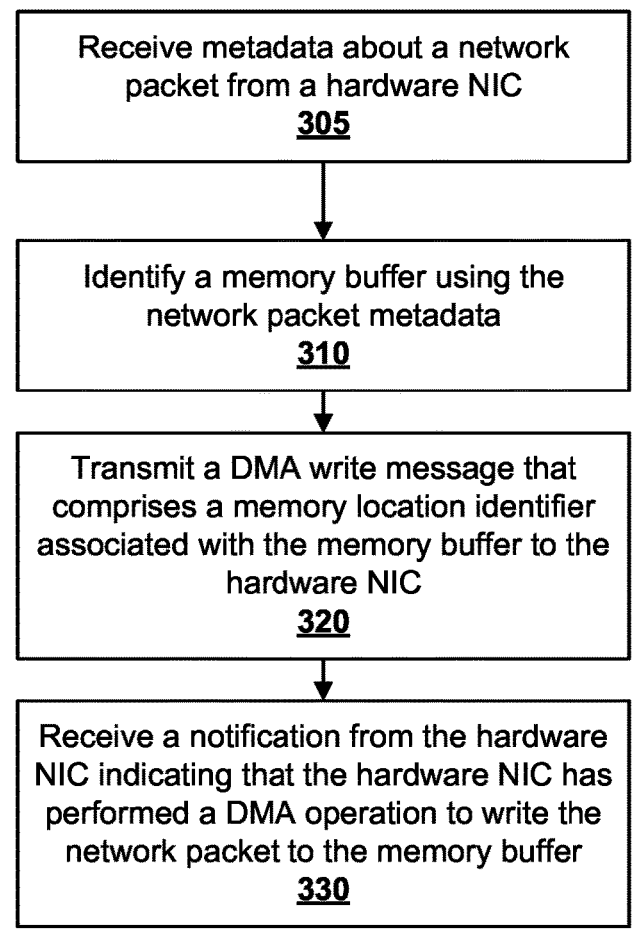
FIG. 3 is a flowchart of an example method for identifying a destination memory buffer for a network packet DMA write operation using network packet metadata.

FIG. 3 is a flowchart of an example method 300 for identifying a destination memory buffer for a network packet DMA write operation using network packet metadata. Any of the example apparatuses and systems described herein can be used to perform all or part of the example method 300. For example, the network traffic management apparatus 210, depicted in FIG. 2, can be used to perform all or part of the example method 300.

At 305, metadata about a network packet is received by an agent process running on a host computer. The metadata about the network packet can be received from a hardware NIC connected to the host computer. For example, the agent process 250 running on the network traffic management apparatus 210 can receive metadata about a network packet from the hardware NIC 220.

At 310, a memory buffer of the host computer is identified by the agent process using the metadata about the network packet. For example, the agent process 250 can identify a memory buffer of the network traffic management apparatus 210 using the metadata about the network packet.

The metadata about the network packet can comprise an identifier associated with a service process running on the host computer. For example, a plurality of service processes 281-285 can run on the network traffic management apparatus 210. The metadata about the network packet can comprise an identifier associated with one of the plurality of service processes 281-285. In such an embodiment, identifying the memory buffer of the host computer can comprise transmitting a request for a free memory buffer by the agent process to a virtual NIC interface associated with the service process. The memory location identifier can then be received by the agent process from the virtual NIC interface. For example, the network traffic management apparatus 210 can comprise a plurality of virtual NIC interfaces 271-275 associated with the plurality of service processes 281-285. The agent process 250 can transmit a request for a free memory buffer to a virtual NIC interface, of the plurality of virtual NIC interfaces 271-275, that is associated with the service process, of the plurality of service processes 281-285, that is identified by the service process identifier. The agent process 250 can then receive a memory location identifier from the virtual NIC interface to which the request for a free memory buffer was transmitted. The memory location identifier can be associated with a starting memory location of the requested free memory buffer. In a particular example, the agent process 250 determines that the identifier in the metadata about the network packet is associated with the service process 281 and transmits a request for a free memory buffer to the virtual NIC interface 271 associated with the service process 281. The agent process 250 then receives a memory location identifier for the memory location 261 from the virtual NIC interface 271. Optionally, the memory 230 can comprise a data structure 290 that can be used by the agent process 250 to identify a service process, of the plurality of service processes 281-285, and/or a virtual NIC interface, of the plurality of virtual NIC interfaces 271-275, using the metadata about the network packet. For example, the agent process 250 can look up the service process and/or the virtual NIC interface using a service identifier included in the metadata.

At 320, a DMA write message is transmitted by the agent process to the hardware NIC, wherein the DMA write message comprises a memory location identifier associated with the memory buffer. For example, the agent process 250 can transmit a memory location identifier associated with a starting memory location (e.g., 261) of the memory buffer to the hardware NIC 220.

At 340, a notification message is received by the agent process from the hardware NIC that indicates that the hardware NIC has performed a DMA operation to write the network packet to the memory buffer of the host computer. For example, the agent process 250 can receive a notification message from the hardware NIC 220 that indicates that the hardware NIC 220 has performed a DMA operation to write the network packet to a memory buffer of the network traffic management apparatus 210. In a particular example, the agent process 250 can transmit a DMA write message to the hardware NIC 220 that comprises a memory location identifier for the memory location 251. The agent process 250 then receives a notification message from the hardware NIC 220 that indicates that the hardware NIC 220 has performed a DMA operation to write the network packet to a memory buffer starting at the memory location 261.

In an embodiment in which the metadata about the network packet comprises an identifier associated with a service process running on the host computer, a notification message can be transmitted by the agent process to a virtual NIC interface associated with this service process, wherein the notification message indicates that the network packet has been written to the memory buffer using a DMA operation. For example, after receiving a notification message from the hardware NIC 220 indicating that the network packet has been written to the memory buffer, the agent process 250 can transmit another notification message to a virtual NIC interface (e.g., 271) associated with the service process (e.g., 281) identified in the metadata about the network packet. The notification message can indicate to the service process (e.g., 281) that the network packet has been written to the memory buffer. The service process (e.g., 281) can then read the network packet from the memory buffer and, in at least some cases, can free the memory buffer to make it available to receive additional network packets.

In a different or further embodiment, the metadata about the network packet can comprise a tenant identifier. Such a tenant identifier can be used to uniquely identify an entity (such as a customer, organization, group, etc.) associated with multiple service processes running on the host computer. In such an embodiment, a plurality of service processes running on the host computer that are associated with the tenant identifier can be identified. The agent process can transmit a plurality of requests for free memory buffers to the plurality of service processes, and can receive a plurality of memory location identifiers from the plurality of service processes in response. The agent process can then transmit a plurality of DMA write messages to the hardware NIC. For example, the agent process 250 can identify a plurality of service processes (e.g., 281-285) running on the network traffic management apparatus 210 that are associated with a tenant identifier included in the metadata about the network packet. The agent process 250 can transmit a plurality of requests for free memory buffers to the plurality of identified service processes. For example, the agent process 250 can transmit a first request for a free memory buffer to the virtual NIC interface 271 associated with the service process 281, and can also transmit a second request for a free memory buffer to the virtual NIC interface 275 associated with the service process 285. The agent process 250 can then receive a plurality of memory locations (e.g., 261-265) from the plurality of service processes 281-285. For example, the agent process 250 can receive a first memory location identifier (e.g., 261) associated with a first free memory buffer from the virtual NIC interface 271, and can receive a second memory location identifier (e.g., 265) associated with a second free memory buffer from the virtual NIC interface 275.

The agent process 250 can then transmit a plurality of DMA write messages to the hardware NIC 220. For example, the agent process 250 can transmit a first DMA write message comprising the memory location identifier associated with the memory location 261 to the hardware NIC 220, and can transmit a second DMA write message comprising a memory location identifier associated with the memory location 265 to the hardware NIC 220. Upon receipt of the plurality of DMA write messages, the hardware NIC 220 can perform a plurality of DMA operations to write the network packet to locations in the memory 230 (e.g., 261 and 265) associated with the plurality of memory location identifiers.

Figure 4:
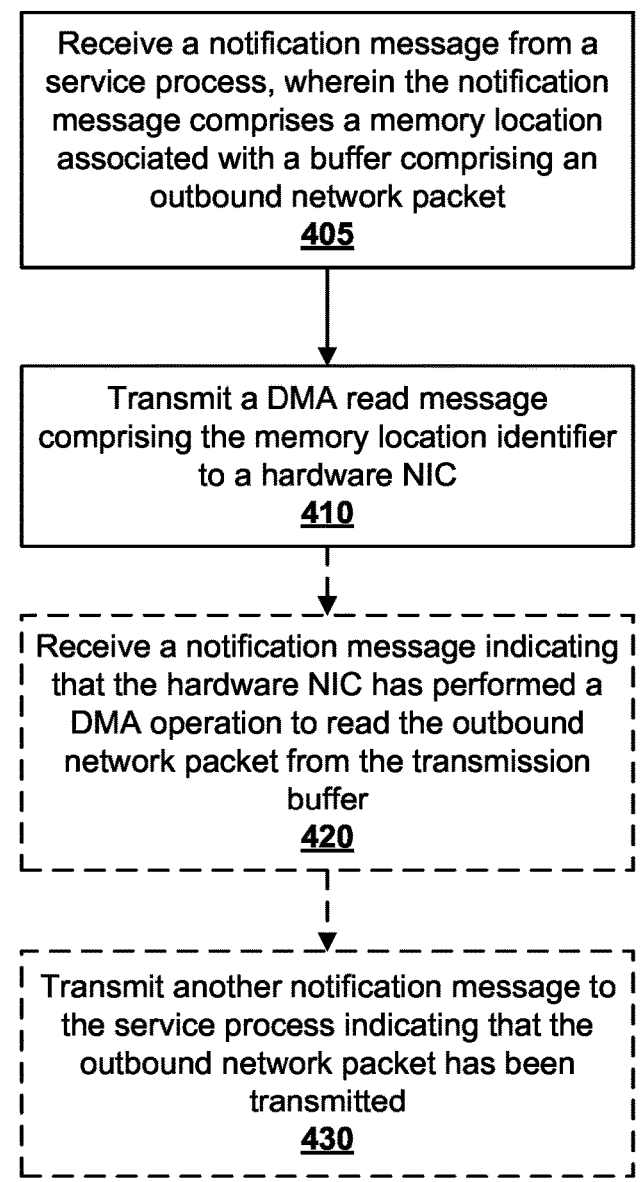
FIG. 4 is a flowchart of an example method for processing an outbound network packet by an agent process.

FIG. 4 is a flowchart of an example method 400 for processing an outbound network packet by an agent process. Any of the example apparatuses and systems described herein can be used to perform all or part of the example method 400. For example, the network traffic management apparatus 210 depicted in FIG. 2 can be used to perform all or part of the example method 400.

At 405, a notification message is received by an agent process from a service process running on a host computer, wherein the notification message comprises a memory location identifier associated with a buffer comprising an outbound network packet. For example, the agent process 250 can receive a notification message from the service process 281 running on the network traffic management apparatus 210. Such a notification message can be received via the virtual NIC interface 271 associated with the service process 281. In at least some embodiments, receiving the notification message can comprise polling the service process periodically to determine whether any outbound network packets are available for transmission. A memory location identifier associated with the buffer comprising the outbound network packet can be received in response to such a polling operation. For example, the agent process 250 can poll the virtual NIC interface 271 associated with the service process 281 periodically to determine whether any outbound network packets from the service process 281 are waiting for transmission. Similarly, the agent process 250 can poll the virtual NIC interface 275 associated with the service process 285 periodically to determine any outbound network packets from the service process 285 are waiting for transmission. The agent process 250 can perform such polling operations for each service process that can generate outbound network packets (e.g., for each service with which the agent process 250 can communicate using a virtual NIC interface).

At 410, the agent process transmits a DMA read message comprising the memory location identifier to the hardware NIC. For example, the agent process 250 can transmit a DMA read message comprising the memory location identifier to the hardware NIC 220.

Optionally, at 420, a notification message is received by the agent process that indicates that the hardware NIC has performed a DMA operation to read the outbound packet from the memory buffer. For example, the agent process 250 can receive a notification message from the hardware NIC 220 that indicates that the hardware NIC 220 has performed a DMA operation to read the outbound network packet from the buffer.

The notification message can comprise a data structure that is transmitted by the hardware NIC to the agent process. This can comprise a writing of a data structure by the hardware NIC to a memory region that is accessible by the agent process. Additionally or alternatively, receiving the notification message can comprise observing a change to a data structure (such as a change to an index value) by the agent process. For example, the agent process can be configured to monitor a data structure in a shared memory region. The hardware NIC can make one or more changes to this data structure to indicate that the hardware NIC has performed the DMA operation to read the outbound packet from the memory buffer. The agent process can then receive this notification message by observing the change(s) made by the hardware NIC to the data structure in the shared memory region.

Optionally, at 430, the agent process transmits another notification message to the service process indicating that the outbound network packet has been transmitted. For example, the agent process 250 can transmit a notification message to the virtual NIC interface 271 associated with the service process 281, indicating that the outbound network packet has been transmitted.

The notification message can comprise a data structure that is transmitted by the agent process to the service process. This can comprise a writing of a data structure by the agent process to a memory region that is accessible by the service process (and/or a virtual NIC interface of the service process). Additionally or alternatively, receiving the notification message can comprise observing a change to a data structure (such as a change to an index value) by the service process. For example, the service process (and/or a virtual NIC interface of the service process) can be configured to monitor a data structure in a shared memory region. The agent process can make one or more changes to this data structure to indicate that the outbound packet has been read from the memory buffer. The service process can then receive this notification message by observing the change(s) made by the agent process to the data structure in the shared memory region.

In a particular example, the agent process 250 polls the virtual NIC interface 271 of the service process 281 and receives a response indicating that an outbound network packet is available in a memory buffer beginning at memory location 261. Such polling can comprise observing a data structure in a shared memory region for changes that indicate an outbound packet is present in the memory buffer beginning at the memory location 261. The agent process 250 transmits a DMA read message comprising a memory location identifier associated with the memory location 261 to the hardware NIC 220. The agent process 250 receives a notification message from the hardware NIC 220 indicating that the outbound network packet has been read from the memory location 261. Receiving the notification message from the hardware NIC 220 can comprise observing a change to a data structure in a shared memory region by the agent process 250. The agent process 250 then transmits a notification message to the virtual NIC interface 271 of the service process 281, indicating that the outbound network packet has been transmitted. Transmitting the notification message to the virtual NIC interface 271 can comprise transmitting a data structure via the interface 271. Additionally or alternatively, transmitting the notification message can comprise making a change to a data structure in a shared memory region. The service process 281 can then free the buffer starting at the memory location 261 and/or make the buffer starting at the memory location 261 available for storing additional outbound network packets.

Figure 5:
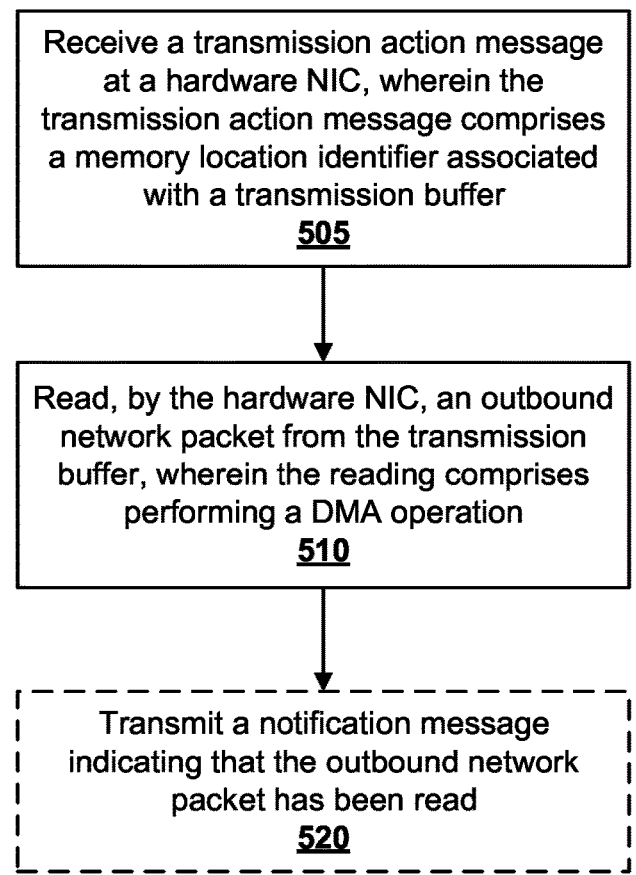
FIG. 5 is a flowchart of an example method for processing an outbound network packet by a hardware network interface controller (NIC).

FIG. 5 is a flowchart of an example method 500 for processing an outbound network packet by a hardware NIC. Any of the example apparatuses and systems described herein can be used to perform all or part of the example method 500. For example, the network traffic management apparatus 210, depicted in FIG. 2, can be used to perform all or part of the example method 500.

At 505, a transmission action message is received at a hardware NIC from an agent process running on a host computer to which the hardware NIC is connected. The transmission action message can comprise a memory location identifier associated with a transmission buffer of the host computer. For example, the hardware NIC 220 can receive a transmission action message from the agent process 250 that comprises in memory location identifier associated with a first memory location (e.g., 261) of a transmission buffer.

At 510, an outbound network packet is read from the transmission buffer by the hardware NIC, wherein the reading comprises performing a DMA operation. For example, the hardware NIC 220 can perform a DMA operation to read an outbound network packet from a transmission buffer starting at the memory location 261. The hardware NIC 220 can then transmit the outbound network packet via one or more computer networks to which the hardware NIC 220 is connected.

Optionally, at 520, the hardware NIC can transmit a notification message to the agent process, indicating that the outbound network packet has been read from the transmission buffer. For example, the hardware NIC 220 can transmit a notification message to the agent process 250, indicating that the outbound network packet has been read from the memory location 261.

Figure 6:
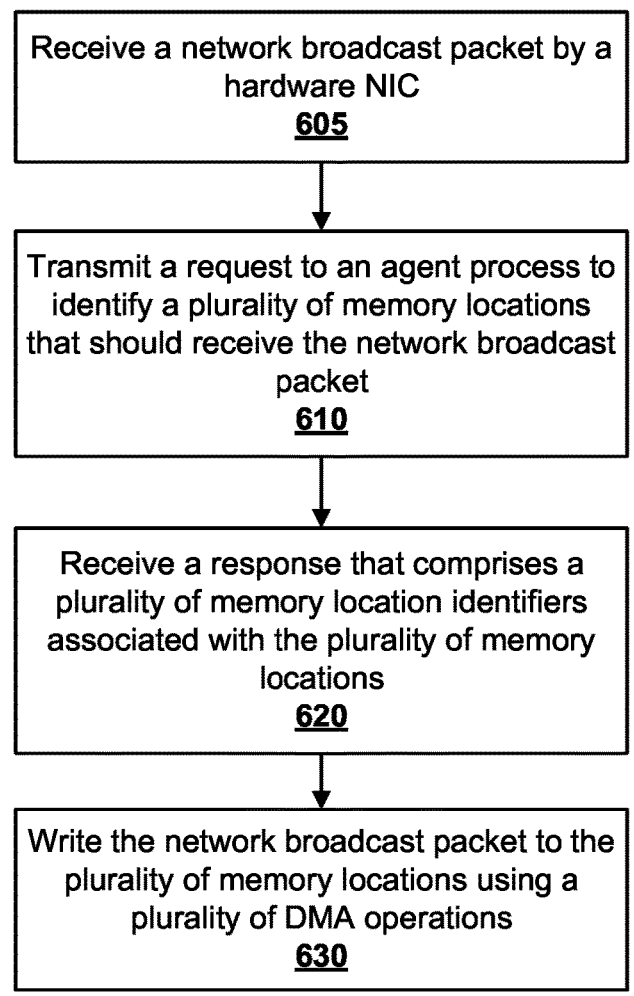
FIG. 6 is a flowchart of an example method for processing multi-destination network broadcast packets using DMA operations.

FIG. 6 is a flowchart of an example method 600 for processing multi-destination network broadcast packets using DMA operations. Any of the example apparatuses and systems described herein can be used to perform all or part of the example method 600. For example, the network traffic management apparatus 210, depicted in FIG. 2, can be used to perform all or part of the example method 600. Additionally or alternatively, the example system 700, depicted in FIG. 7, can be used to perform all or part of the example method 600.

Figure 7:
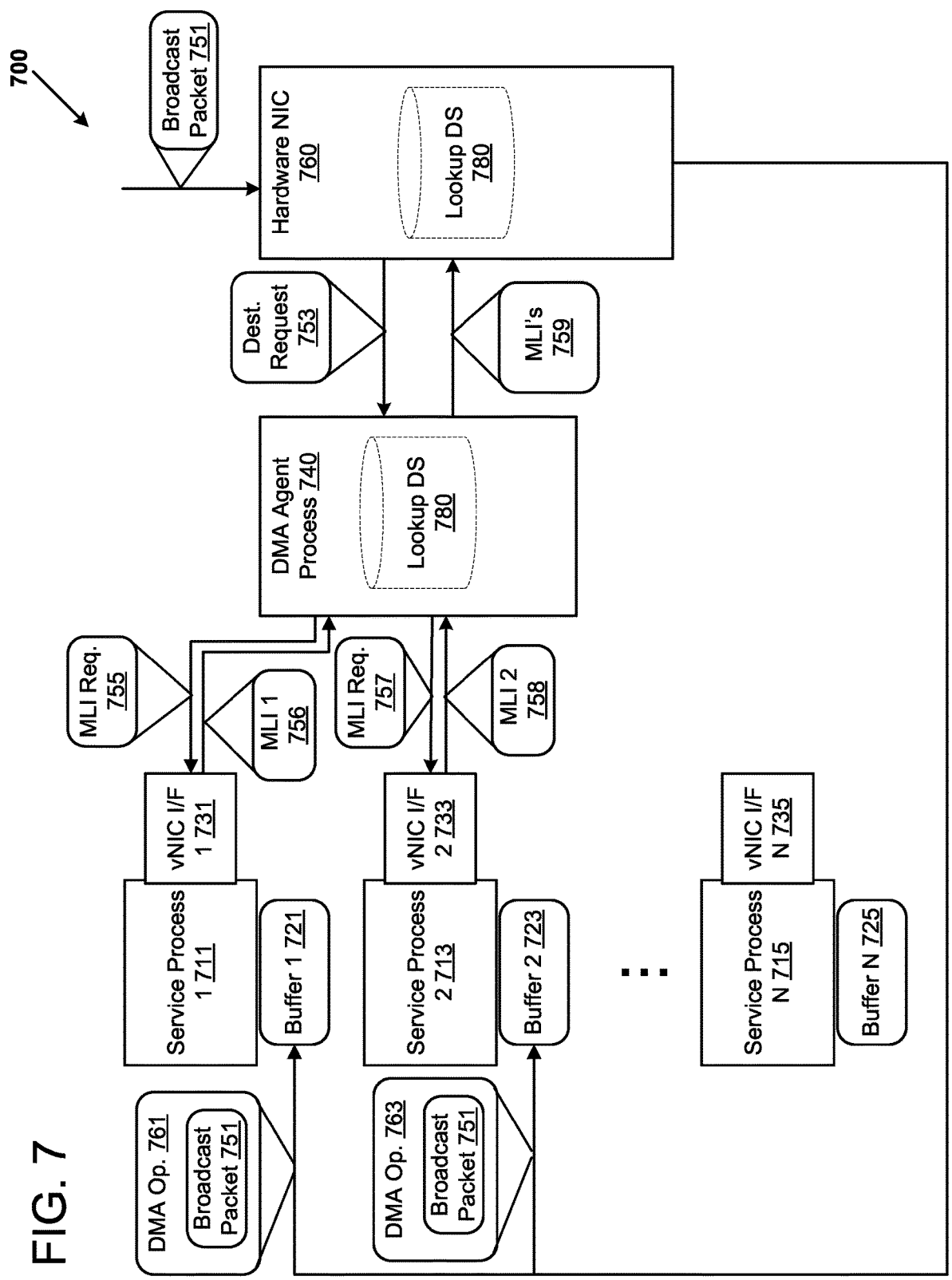
FIG. 7 is a system diagram of an example system for performing network packet DMA operations.

FIG. 7 is a system diagram of an example system 700 for performing network packet DMA operations. The example system 700 comprises a plurality of service processes 711-715, an agent process 740, and a hardware NIC 760. In at least some embodiments, the plurality of service processes 711-715 and the agent process 740 can be running on a single host computer to which the hardware NIC 760 is connected. However, other configurations are possible. The plurality of service processes 711-715 are associated with a plurality of virtual NIC interfaces 731-735. The agent process 740 is configured to communicate with the plurality of virtual NIC interfaces 731-735. The plurality of service processes 711-715 can be associated with a plurality of memory buffers 721-725. The plurality of memory buffers 721-725 can be used to store network packets generated by the plurality of service processes 711-715, and network packets destined for the plurality of service processes 711-715. A single memory buffer is depicted in FIG. 7 in association with each service process. However, it is possible for service processes to be associated with multiple memory buffers.

Referring to FIG. 6, at 605, a network broadcast packet is received by a hardware NIC connected to a host computer. The network broadcast packet can be received from another computing device connected to the host computer by a computer network. Alternatively, the network broadcast packet can be received from a service process running on the host computer. For example, a network broadcast packet 751 can be received by the hardware NIC 760. The network broadcast packet can be a packet intended for more than one destination. For example, a broadcast packet can be a packet intended to be transmitted to all receivers connected to a specified computer network (or specified sub-network). Additionally or alternatively, a broadcast packet can be based on a destination lookup failure (DLF) of a unicast packet. In at least some embodiments, a destination address of a broadcast packet can contain a special value that indicates that it is a broadcast packet. For example, an IP broadcast packet can have a destination IP address header value of all 1's (e.g., 255.255.255.255).

At 610, a request is transmitted by the hardware NIC to an agent process running on the host computer to identify a plurality of memory locations in the host computer that should receive the network broadcast packet. For example, the hardware NIC 760 can transmit a request 753 to the agent process 740 to identify a plurality of memory locations (e.g., buffers 721 and 723) that should receive the network broadcast packet 751.

At 620, a response is received by the hardware NIC from the agent process that comprises a plurality of memory location identifiers associated with the plurality of memory locations in the host computer that should receive the network broadcast packet. For example, the hardware NIC 760 can receive a response 759 that comprises a plurality of memory location identifiers associated with a plurality of memory locations (e.g., 721 and 723) that should receive the network broadcast packet 751. Although response 759 is depicted in FIG. 7 as a single message, in at least some embodiments the response can comprise a plurality of messages. For example, the agent process 740 can transmit a plurality of messages, wherein each message comprises one of the plurality of memory location identifiers. In such embodiments, the agent process 740 can transmit a special message (not shown) that indicates that all memory location identifiers for the network broadcast packet 751 have been sent.

At 630, the network broadcast packet is written to the plurality of memory locations that are associated with the plurality of memory location identifiers by the hardware NIC, wherein the writing comprises performing a plurality of DMA operations. For example, the hardware NIC 760 performs a plurality of DMA operations (e.g., 761 and 763) to write the network broadcast package 751 to the plurality of memory locations (e.g., 721 and 723) associated with the plurality of memory location identifiers included in the response 759.

In at least some embodiments, the agent process can identify a plurality of service processes based on contents of the request received by the hardware NIC. The agent process can then transmit a plurality of requests to a plurality of virtual NIC interfaces associated with the plurality of service processes. The agent process receives a plurality of responses from the plurality of virtual NIC interfaces, wherein the plurality of responses comprise the plurality of memory location identifiers. The plurality of memory location identifiers can be identifiers for memory buffers where the plurality of service processes can read the network broadcast packet after it is written by the hardware NIC. For example, the agent process 740 can identify a plurality of service processes (e.g., 711 and 713) that should receive the network broadcast packet 751 based on contents of the request 753. The agent process 740 can transmit a plurality of requests (e.g., 755 and 757) for free memory buffers (e.g., 721 and 723) to a plurality of virtual NIC interfaces (e.g., 731 and 733) that are associated with the identified plurality of service processes (e.g., 711 and 713). The agent process 740 can receive a plurality of responses (e.g., 756 and 758) from the plurality of virtual NIC interfaces (e.g., 731 and 733) to which requests for free memory buffers were transmitted. The plurality of responses (e.g., 756 and 758) can comprise memory locations associated with free memory buffers for the respective service processes (e.g., 711 and 713). The agent process can generate a plurality of DMA descriptors (not shown) using the plurality of memory location identifiers (e.g., 756 and 758). The DMA descriptors can be used by the hardware NIC 760 to perform DMA write operations that target memory locations (e.g., 721 and 723) associated with the memory location identifiers in the DMA descriptors. The plurality of DMA descriptors can be included in the response 759 to the hardware NIC 760.

In at least one embodiment, the request to identify the plurality of memory locations comprises all or part of the network broadcast packet. For example, the request 753 can comprise all or part of the network broadcast packet 751. In such an embodiment, the agent process 740 can identify the plurality of service processes (e.g., 711 and 713) that should receive the network broadcast packet 751 based on contents of the network broadcast packet 751.

Optionally, the agent process can use a data structure to identify service processes that should receive the network broadcast packet based on contents of the network broadcast packet. For example, the agent process 740 can use contents of the network broadcast packet 751 to identify service processes that should receive the network broadcast packet in a lookup data structure 780. The contents of the data structure 780 can be updated by the agent process 740 based on interactions between the agent process 740 and the plurality of virtual NIC interfaces 731-735. For example, a virtual NIC interface (e.g., 731) can register with the agent process 740. The registration can comprise a service identifier for the associated service process (e.g., 711), a tenant identifier for a tenant associated with the service process, and/or one or more virtual network identifiers. The agent process 740 can update the data structure 780 to associate the virtual NIC interface (e.g., 731) with one or more virtual networks and/or an included tenant identifier.

In a different or further embodiment, the request to identify the plurality of memory locations comprises metadata about the network broadcast packet. For example, the request 753 can comprise metadata about the network broadcast packet 751. Such metadata can include a tenant identifier or associated with the network broadcast packet. For example, the hardware NIC 760 can identify a tenant associated with the network broadcast packet 751 based on contents of the network broadcast packet 751. In a particular example, the hardware NIC 760 can identify a tenant associated with a source identifier (such as a source IP address) of the network broadcast packet 751.

The agent process 740 can identify a plurality of service processes (e.g., 711 and 713) based on the metadata in the request 753. In an embodiment where the metadata comprises a tenant identifier, the agent process 740 can identify a plurality of service processes (e.g., 711 and 713) associated with the tenant identifier. In a particular embodiment, the agent process 740 identifies a plurality of service processes that are part of a virtual network associated with the tenant identifier contained in the request 753.

Optionally, the agent process can use a data structure to identify service processes that should receive the network broadcast packet based on the metadata about the network broadcast packet. For example, the agent process 740 can use metadata about the network broadcast packet 751 to identify service processes that should receive the network broadcast packet in the lookup data structure 780. The contents of the data structure 780 can be updated by the agent process 740 based on interactions between the agent process 740 and the plurality of virtual NIC interfaces 731-735. For example, a virtual NIC interface (e.g., 731) can register with the agent process 740. The registration can comprise a service identifier for the associated service process (e.g., 711) and/or a tenant identifier for a tenant associated with the service process. The agent process 740 can update the data structure 780 to associate the virtual NIC interface (e.g., 731) with one or more virtual networks and/or the included tenant identifier.

In at least some embodiments, the hardware NIC can identify a plurality of service processes running on the host computer that should receive the network broadcast packet based on contents of the network broadcast packet. In such embodiments, the request to identify the plurality of memory locations can comprise a plurality of service identifiers associated with the plurality of service processes. For example, the hardware NIC 760 can identify a plurality of services (e.g., 711 and 713) that should receive the network broadcast packet 751 based on contents of the network broadcast packet 751. For example, the hardware NIC 760 can determine a tenant identifier associated with the network broadcast packet 751, and can then identify a plurality of service processes (e.g., 711 and 713) associated with the tenant identifier. In such an embodiment, the request 753 can comprise identifiers associated with the plurality of service processes.

Optionally, the hardware NIC can use a data structure to identify service processes that should receive the network broadcast packet based on contents of the network broadcast packet. For example, the hardware NIC 760 can use contents of the network broadcast packet 751 to identify service processes that should receive the network broadcast packet 751 in the lookup data structure 780. The lookup data structure can be stored in a memory of the hardware NIC 760. The contents of the data structure 780 can be updated by the agent process 740 based on interactions between the agent process 740 and the plurality of virtual NIC interfaces 731-735. For example, a virtual NIC interface (e.g., 731) can register with the agent process 740. The registration can comprise a service identifier for the associated service process (e.g., 711), a tenant identifier for a tenant associated with the service process, and/or one or more virtual network identifiers. The agent process 740 can update the contents of the data structure 780 in the memory of the hardware NIC 760 to associate the service (e.g., 711) with one or more virtual networks and/or a tenant identifier. Thus, as service processes are registered and/or unregistered with the agent process 740, the agent process 740 can make changes to the data structure 780 stored in the onboard memory of the hardware NIC 760 to reflect these changes.

In at least some embodiments, the response from the agent process comprises a plurality of DMA descriptors that comprise the plurality of memory location identifiers. For example, the response 759 can comprise a plurality of DMA descriptors comprising the plurality of memory location identifiers associated with memory locations (e.g., 721 and 723) to which the network broadcast packet 751 should be written. The agent process 740 can generate the plurality of DMA descriptors and transmit them in the response 759 to the hardware NIC 760. The hardware NIC can use the DMA descriptors to perform the plurality of DMA operations (e.g., 761 and 763).

Figure 8:
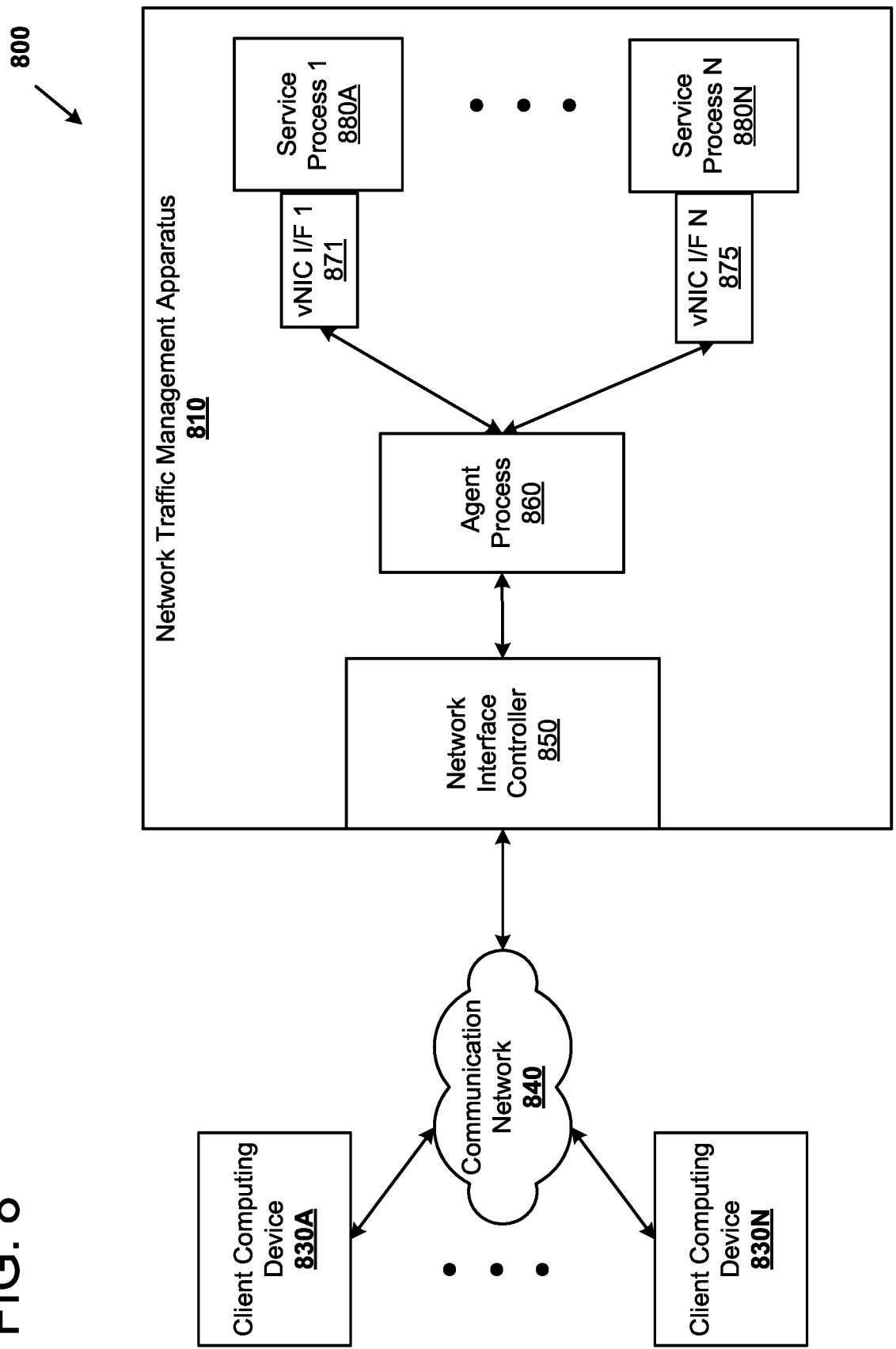
FIG. 8 is a block diagram of an example client-server architecture including a network traffic management apparatus configured for performing network packet DMA operations.

FIG. 8 illustrates an example client-server architecture 800 (also referred to as a network traffic management system) that incorporates a network traffic management apparatus 810. The client-server architecture 800 includes the network traffic management apparatus 810 that is coupled to one or more client devices (such as client computing devices 830A-N) via one or more communication networks (such as the communication network 840).

The service processes 880A-N can communicate with the client computing devices 830A-N and/or one or more additional server computer(s) (not shown) that are accessible via the communication network 840 via the agent process 860 and the network interface controller (NIC) 850. As one example, the communication network 840A can include a public network (e.g., the Internet) and devices attached to the network 840 that can be accessed using public network addresses. Additionally or alternatively, the communication network 840 can include a private network and devices attached to the network 840 that can be accessed using private network addresses. Although a single network traffic management apparatus 810 is depicted in FIG. 8, it is possible for multiple network traffic management apparatuses running additional service processes to be connected to the communication network 840. For example, multiple network traffic management apparatuses such as 810 can be connected to the communication network 840 and configured to operate as a cloud computing environment.

The communication network 840 can include various wired and/or wireless communication technologies, such as a local area network (LAN), a wide area network (WAN), an intranet, the Internet, a public switched telephone network (PSTN), and so forth. The devices connected to the communication network 840 can communicate with each other using various communications protocols, such as transmission control protocol with Internet protocol (TCP/IP) over Ethernet and/or other customized or industry-standard protocols. The communication protocols can be used to transmit information over the network 840 using packet-based messages (e.g., Ethernet-based packet data networks) and/or other application programming interfaces (APIs). An API is a programmatic interface (e.g., a set of methods and/or protocols) for communicating among different modules. The communication network 840 can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. It should be noted that the network topology illustrated in FIG. 8 has been simplified and that multiple networks and networking devices can be utilized to interconnect the various computing systems disclosed herein. Additionally, one or more of the devices of the client-server architecture 800 in these examples can be in a same or a different communication network including one or more public, private, or cloud networks, for example.

Figure 9:
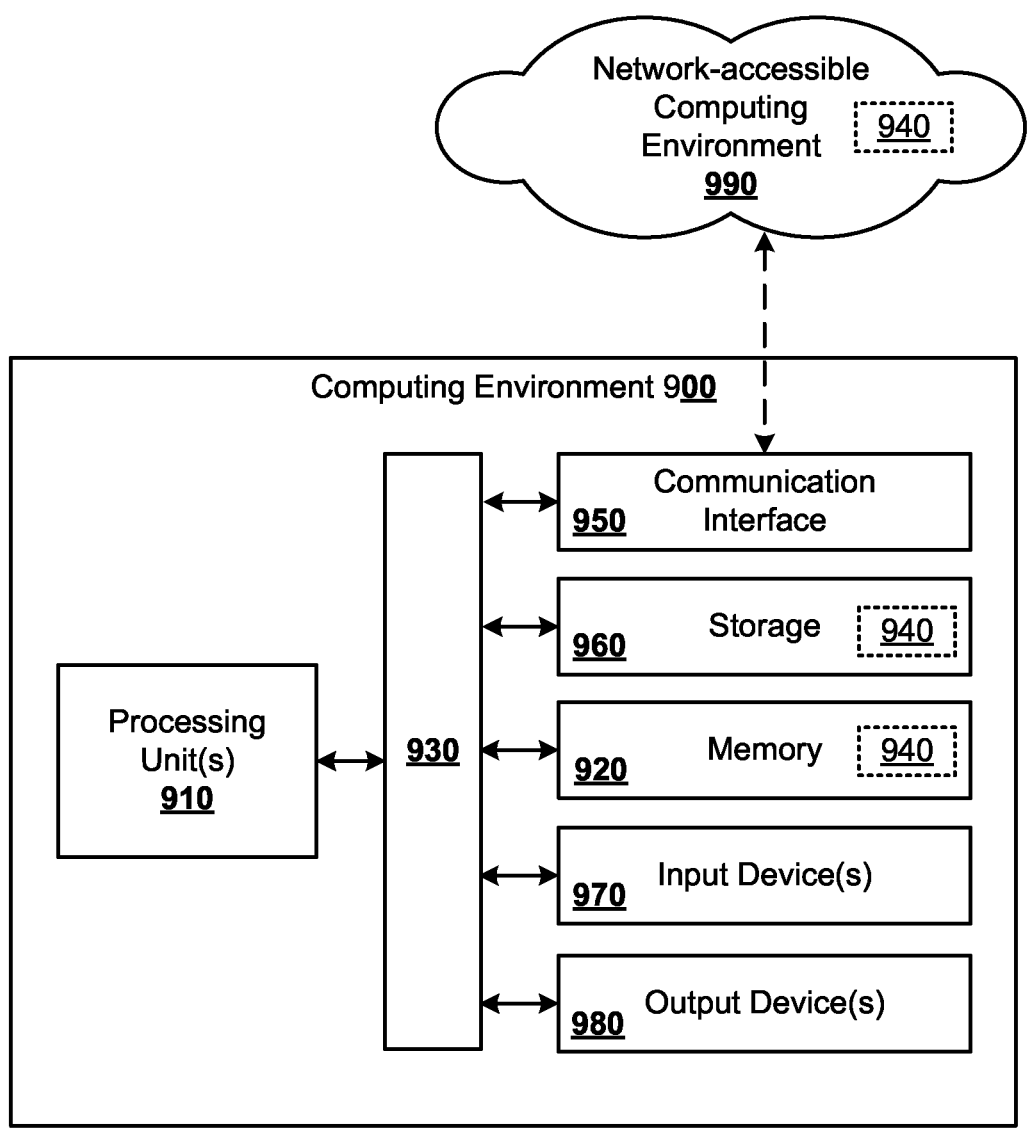
FIG. 9 is a block diagram of an example computing environment.

Generally, the service processes 880A-N, the client devices 830A-N, and the network traffic management system 800 can perform various computing tasks that are implemented using a computing environment, such as the computing environment described in more detail with respect to FIG. 9. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 830A-N can include any type of computing device that can exchange network data, such as mobile communication devices, laptop computers, desktop computers, tablet computers, virtual machines executing within a cloud-computer-based environment, and so forth. The client devices 830A-N can run interface applications, such as web browsers or standalone client applications, which may provide an interface to communicate with (e.g., make requests for, and receive content stored on) one or more of the service processes 880A-N via the communication network 840. The client devices 830A-N can further include an output device (such as a display screen or touchscreen (not illustrated)) and/or an input device (such as a keyboard (not illustrated)). Additionally, one or more of the client devices 830A-N can be configured to execute software code (e.g., JavaScript code within a web browser) in order to log client-side data and provide the logged data to the network traffic management apparatus 810.

The network traffic management apparatus 810 comprises the NIC 850, agent process 860, and the plurality of service processes 880A-N. The agent process can communicate with the plurality of service processes 880A-N via a plurality of virtual NIC interfaces 871-875. The service processes 880A-N can communicate with computing devices (e.g., client computing devices 830A-N) connected to the communication network 840 by exchanging network packets using the plurality of virtual NIC interfaces 871-875, the agent process 860, and the NIC 850 as described herein.

The service processes 880A-N can exchange network data with the client devices 830A-N and with each other. As another example, the service processes 880A-N can exchange communications along communication paths specified by application logic in order to facilitate a client-server application interacting with the client devices 830A-N. Examples of the service processes 880A-N can include application services, database services, access control services, web services, and encryption services. Accordingly, in some examples, one or more of the service processes 880A-N process login and other requests received from the client devices 830A-N via the communication network 840 according to the Hypertext Transfer Protocol (HTTP) or Hypertext Transfer Protocol Secure (HTTPS) application-layer protocol. A web application may be running as part of one or more of the service processes 880A-N and transmitting data (e.g., files or web pages) to the client devices 830A-N in response to requests from the client devices 830A-N. The service processes 880A-N may represent a system with multiple servers in a pool, which may include internal or external networks.

The service processes 880A-N are not limited to a particular configuration. Thus, the service processes 880A-N may operate using a coordinated approach, whereby one of the service processes 880A-N operates to manage or otherwise coordinate operations of the other service processes. Each of the service processes 880A-N can operate within a cluster architecture, a within a peer-to-peer architecture, a virtual machine, or a resource within a cloud-based computer architecture, for example. Thus, the technology disclosed herein is not to be construed as being limited to a single environment and other configurations and architectures are also envisaged.

The network traffic management apparatus 810 can perform a number of functions, including providing network security, access control, load balancing network traffic across the service processes 880A-N, and/or accelerating network traffic associated with an application hosted by one or more of the service processes 880A-N, for example. Such functions can be performed by one or more of the service processes 880A-N or one or more other components of the network traffic management apparatus 810. One or more of the service processes 880A-N can be incorporated into workloads that are executed by the network traffic management apparatus 810. For example, the network traffic management apparatus 810 can include a workload that is used to perform proxy and other services on behalf of one or more of the service processes 880A-N and to manage traffic between the clients 830A-N and the service processes 880A-N. Additionally, the network traffic management apparatus 810 can include other network devices such as one or more routers or switches, for example.

While the network traffic management apparatus 810 is illustrated in this example as including a single device, the network traffic management apparatus 810 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 810. Additionally, the network traffic management apparatus 810 and/or the application(s) executed by the network traffic management apparatus 810 can be operative in a cloud-based computing environment. The application(s) can be executed within or as virtual machine(s) or virtual server(s) that can be managed in a cloud-based computing environment. For example, the application(s), and even the network traffic management apparatus 810 itself, can be located in virtual server(s) running in a cloud-based computing environment rather than being tied to one or more specific physical network computing devices. Also, the application(s) can be running in one or more virtual machines (VMs) executing in one or more of the service processes 880A-N on the network traffic management apparatus 810. Additionally, in one or more examples of this technology, virtual machine(s) running on the network traffic management apparatus 810 can be managed or supervised by a hypervisor.

FIG. 9 illustrates a block diagram of a generalized example of a suitable computing environment 900 that can be used to implement the examples, techniques, and technologies described herein. For example, the computing environment 900 can be used to implement a computing device (such as a network traffic management apparatus) that performs network packet DMA operations as described herein.

The computing environment 900 includes at least one processing unit 910 and computer-readable memory 920, which are coupled together by an interconnect 930. The processing unit 910 executes computer-executable instructions. The processing unit 910 can include a general purpose processor, a special-purpose processor, and combinations thereof. For example, the processing unit 910 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 920 stores software 940 implementing one or more innovations described herein, in the form of computer-executable instructions suitable for execution by the processing unit 910. Specifically, the memory 920 can be used to store computer-executable instructions, data structures, input data, output data, and other information. The memory 920 can include volatile memory (e.g., registers, cache, random-access memory (RAM)), non-volatile memory (e.g., read-only memory (ROM), electrically erasable programmable ROM (EEPROM), and flash memory), and/or combinations thereof. The memory 920 can include operating system software (not illustrated). Operating system software can provide an operating environment for other software executing in the computing environment 900 and can coordinate activities of the components of the computing environment 900.

The interconnect 930 is used to connect different components of the computing environment 900 together so that the processing unit 910 can communicate with the different components and/or so that the different components can communicate with each other. For example, the interconnect 930 can include a bus, controller, and/or a network. As one example, the interconnect 930 can include a host bridge (also referred to as a northbridge) for connecting the processing unit 910 to relatively high-speed components (such as the memory 920) and an input/output bridge (also referred to as a southbridge) for connecting to relatively lower-speed components (such as a communications interface 950) within the computing environment 900. In some examples, one or more components of the computing environment 900 can be integrated within or connected directly to the processing unit 910.

The computing environment 900 can include a communication interface 950 for communicating with another computing entity using a communication medium (e.g., a physical layer). The communication interface 950 can implement all or a portion of a network protocol stack. The network protocol stack defines communication formats and rules for communicating between different devices connected to a network. For example, the network protocol stack can define modular layers for communication using the Open Systems Interconnection (OSI) model or another model (such as the Internet Protocol Suite). The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 950 can include electronic and/or optical circuitry to receive and transmit communications signals that are encoded (e.g., according to a physical layer specification of the network stack) using an electrical, optical, radio frequency (RF), or another carrier signal. Accordingly, the communication interface 950 can be used to communicate over wired connections (e.g., twisted-wire pair, coaxial cable, and fiber optic connections) and/or wireless technologies (e.g., Bluetooth, Wi-Fi (IEEE 802.11), and cellular). As a specific example with reference to FIG. 8, the NIC 850 of the network traffic management apparatus 610 can act as a communication interface that operatively couples to and communicates with the communication network 840.

The computing environment 900 can include storage 960 that is used to store instructions for the software 940, data structures, and data, which can be used to implement the technologies described herein. The storage 960 can include electronic circuitry for reading and/or writing to removable or non-removable storage media using magnetic, optical, or other reading and writing system that is coupled to the processor. The storage 960 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 900.

The computing environment 900 can include input device(s) 970. For example, the input device(s) 970 can provide an input interface to a user of the computing environment 900 and/or to receive inputs from a physical environment. The input device(s) 970 can include a tactile input device (e.g., a keyboard, a mouse, or a touchscreen), a microphone, a camera, a sensor, or another device that provides input to the computing environment 900.

The computing environment 900 can include output device(s) 980. For example, the output device(s) 980 can provide an output interface to a user of the computing environment 900 and/or to generate an output observable in a physical environment. The output device(s) 980 can include a light-emitting diode, a display, a printer, a speaker, a CD-writer, or another device that provides output from the computing environment 900. In some examples, the input device(s) 970 and the output device(s) 980 can be used together to provide a user interface to a user of the computing environment 900.

The computing environment 900 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 910 and the network-accessible computing environment 990 that is linked through a communications network. In a distributed computing environment, program modules 940 (including executable instructions for performing operations as described herein) can be located in both local and remote memory storage devices.

The term computer-readable media includes non-transient media for data storage, such as memory 920 and storage 960, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

1. A method implemented by a network traffic management system, the method comprising: receiving a network packet at a hardware network interface controller (NIC) connected to a host computer; transmitting, by the hardware NIC, metadata about the network packet to an agent process running on the host computer; receiving a response message at the hardware NIC from the agent process that comprises a memory location identifier; and writing, by the hardware NIC, the network packet to a memory location of the host computer that is associated with the memory location identifier, wherein the writing comprises performing a direct memory access (DMA) operation.

2. The method of claim 1, further comprising: transmitting, by the hardware NIC, a message to the agent process indicating that the writing of the network packet to the memory location of the host computer is complete.

3. The method of claim 1, wherein: the response message comprises a plurality of memory location identifiers, including the memory location identifier; and the writing the network packet comprises writing the network packet to each of a plurality of memory locations associated with the plurality of memory location identifiers, wherein the writing comprises performing a plurality of DMA operations.

4. The method of claim 1, further comprising: receiving a transmission action message at the hardware NIC from the agent process, wherein the transmission action message comprises a memory location identifier associated with a transmission buffer of the host computer; and reading, by the hardware NIC, an outbound network pack from the transmission buffer, wherein the reading comprises performing another DMA operation.

5. The method of claim 1, wherein: the metadata about the network packet comprises an identifier associated with a service process running on the host computer; and the method further comprises generating, by the hardware NIC, the identifier associated with the service process based on contents of the network packet.

6. A system comprising one or more network traffic management modules, networking modules, or server modules, memory comprising programmed instructions stored thereon, and one or more processors configured to be capable of executing the stored programmed instructions to: receive a network packet at a hardware network interface controller (NIC) connected to a host computer; transmit, by the hardware NIC, metadata about the network packet to an agent process running on the host computer; receive a response message at the hardware NIC from the agent process that comprises a memory location identifier; and write, by the hardware NIC, the network packet to a memory location of the host computer that is associated with the memory location identifier, wherein the writing comprises performing a direct memory access (DMA) operation.

7. The system of claim 6, wherein the one or more processors are further configured to be capable of executing the stored programmed instructions to: transmit, by the hardware NIC, a message to the agent process indicating that the writing of the network packet to the memory location of the host computer is complete.

8. The system of claim 6, wherein: the response message comprises a plurality of memory location identifiers, including the memory location identifier; and the writing the network packet comprises writing the network packet to each of a plurality of memory locations associated with the plurality of memory location identifiers, wherein the writing comprises performing a plurality of DMA operations.

9. The system of claim 6, wherein the one or more processors are further configured to be capable of executing the stored programmed instructions to: receive a transmission action message at the hardware NIC from the agent process, wherein the transmission action message comprises a memory location identifier associated with a transmission buffer of the host computer; and read, by the hardware NIC, an outbound network pack from the transmission buffer, wherein the reading comprises performing another DMA operation.

10. The system of claim 6, wherein: the metadata about the network packet comprises an identifier associated with a service process running on the host computer; and the one or more processors are further configured to be capable of executing the stored programmed instructions to generate, by the hardware NIC, the identifier associated with the service process based on contents of the network packet.

11. A non-transitory computer readable medium having stored thereon instructions comprising executable code that, when executed by one or more processors, causes the processors to: receive a network packet at a hardware network interface controller (NIC) connected to a host computer; transmit, by the hardware NIC, metadata about the network packet to an agent process running on the host computer; receive a response message at the hardware NIC from the agent process that comprises a memory location identifier; and write, by the hardware NIC, the network packet to a memory location of the host computer that is associated with the memory location identifier, wherein the writing comprises performing a direct memory access (DMA) operation.

12. The non-transitory computer readable medium of claim 11, wherein the instructions further comprise executable code that, when executed by one or more processors, causes the processors to: transmit, by the hardware NIC, a message to the agent process indicating that the writing of the network packet to the memory location of the host computer is complete.

13. The non-transitory computer readable medium of claim 11, wherein the response message comprises a plurality of memory location identifiers, including the memory location identifier; and the writing the network packet comprises writing the network packet to each of a plurality of memory locations associated with the plurality of memory location identifiers, wherein the writing comprises performing a plurality of DMA operations.

14. The non-transitory computer readable medium of claim 11, wherein the instructions further comprise executable code that, when executed by one or more processors, causes the processors to: receive a transmission action message at the hardware NIC from the agent process, wherein the transmission action message comprises a memory location identifier associated with a transmission buffer of the host computer; and read, by the hardware NIC, an outbound network pack from the transmission buffer, wherein the reading comprises performing another DMA operation.

15. The non-transitory computer readable medium of claim 11, wherein: the metadata about the network packet comprises an identifier associated with a service process running on the host computer; and the instructions further comprise executable code that, when executed by one or more processors, causes the processors to generate, by the hardware NIC, the identifier associated with the service process based on contents of the network packet.

16. A network traffic management apparatus, comprising memory comprising programmed instructions stored thereon and one or more processors configured to be capable of executing the stored programmed instructions to: receive a network packet at a hardware network interface controller (NIC) connected to a host computer; transmit, by the hardware NIC, metadata about the network packet to an agent process running on the host computer; receive a response message at the hardware NIC from the agent process that comprises a memory location identifier; and write, by the hardware NIC, the network packet to a memory location of the host computer that is associated with the memory location identifier, wherein the writing comprises performing a direct memory access (DMA) operation.

17. The network traffic management apparatus of claim 16, wherein the one or more processors are further configured to be capable of executing the stored programmed instructions to: transmit, by the hardware NIC, a message to the agent process indicating that the writing of the network packet to the memory location of the host computer is complete.

18. The network traffic management apparatus of claim 16, wherein: the response message comprises a plurality of memory location identifiers, including the memory location identifier; and the writing the network packet comprises writing the network packet to each of a plurality of memory locations associated with the plurality of memory location identifiers, wherein the writing comprises performing a plurality of DMA operations.

19. The network traffic management apparatus of claim 16, wherein the one or more processors are further configured to be capable of executing the stored programmed instructions to: receive a transmission action message at the hardware NIC from the agent process, wherein the transmission action message comprises a memory location identifier associated with a transmission buffer of the host computer; and read, by the hardware NIC, an outbound network pack from the transmission buffer, wherein the reading comprises performing another DMA operation.

20. The network traffic management apparatus of claim 16, wherein: the metadata about the network packet comprises an identifier associated with a service process running on the host computer; and the one or more processors are further configured to be capable of executing the stored programmed instructions to generate, by the hardware NIC, the identifier associated with the service process based on contents of the network packet.

21. A method implemented by a network traffic management system, the method comprising: receiving metadata about a network packet by an agent process running on a host computer, wherein the metadata about the network packet is received from a hardware network interface controller (NIC) connected to the host computer; identifying, by the agent process, a memory buffer of the host computer using the metadata; transmitting a direct memory access (DMA) write message by the agent process to the hardware NIC, wherein the DMA write message comprises a memory location identifier associated with the memory buffer; and receiving, by the agent process, a notification message from the hardware NIC indicating that the hardware NIC has performed a DMA operation to write the network packet to the memory buffer of the host computer.

22. The method of claim 21, wherein: the metadata about the network packet comprises an identifier associated with a service process running on the host computer; the identifying the memory buffer of the host computer comprises: transmitting a request for a free memory buffer by the agent process to a virtual NIC interface associated with the service process, and receiving the memory location identifier by the agent process from the virtual NIC interface; and the method further comprises transmitting a notification message by the agent process to the virtual NIC interface, wherein the notification message indicates that the network packet has been written to the memory buffer.

23. The method of claim 21, wherein: the metadata about the network packet comprises a tenant identifier; and the method further comprises: identifying a plurality of service processes running on the host computer that are associated with the tenant identifier, transmitting a plurality of requests for free memory buffers to the plurality of service processes, receiving a plurality of memory location identifiers, including the memory location identifier, by the agent process from the plurality of service processes, and transmitting a plurality of DMA write messages, including the DMA write message, by the agent process to the hardware NIC.

24. The method of claim 21, further comprising: receiving, by the agent process, a notification message from a service process running on the host computer, wherein the notification message comprises a memory location identifier associated with a buffer comprising an outbound network packet; and transmitting, by the agent process, a DMA read message comprising the memory location identifier to the hardware NIC.

25. The method of claim 24, further comprising: receiving a notification message by the agent process indicating that the hardware NIC has performed a DMA operation to read the outbound network packet from the buffer; and transmitting another notification message by the agent process to the service process indicating that the outbound network packet has been transmitted.

26. A system comprising one or more network traffic management modules, networking modules, or server modules, memory comprising programmed instructions stored thereon, and one or more processors configured to be capable of executing the stored programmed instructions to: receive metadata about a network packet by an agent process running on a host computer, wherein the metadata about the network packet is received from a hardware network interface controller (NIC) connected to the host computer; identify, by the agent process, a memory buffer of the host computer using the metadata; transmit a direct memory access (DMA) write message by the agent process to the hardware NIC, wherein the DMA write message comprises a memory location identifier associated with the memory buffer; and receive, by the agent process, a notification message from the hardware NIC indicating that the hardware NIC has performed a DMA operation to write the network packet to the memory buffer of the host computer.

27. The system of claim 26, wherein: the metadata about the network packet comprises an identifier associated with a service process running on the host computer; the identifying the memory buffer of the host computer comprises: transmitting a request for a free memory buffer by the agent process to a virtual NIC interface associated with the service process, and receiving the memory location identifier by the agent process from the virtual NIC interface; and the one or more processors are further configured to be capable of executing the stored programmed instructions to transmit a notification message by the agent process to the virtual NIC interface, wherein the notification message indicates that the network packet has been written to the memory buffer.

28. The system of claim 26, wherein: the metadata about the network packet comprises a tenant identifier; and the one or more processors are further configured to be capable of executing the stored programmed instructions to: identify a plurality of service processes running on the host computer that are associated with the tenant identifier, transmit a plurality of requests for free memory buffers to the plurality of service processes, receive a plurality of memory location identifiers, including the memory location identifier, by the agent process from the plurality of service processes, and transmit a plurality of DMA write messages, including the DMA write message, by the agent process to the hardware NIC.

29. The system of claim 26, wherein the one or more processors are further configured to be capable of executing the stored programmed instructions to: receive, by the agent process, a notification message from a service process running on the host computer, wherein the notification message comprises a memory location identifier associated with a buffer comprising an outbound network packet; and transmit, by the agent process, a DMA read message comprising the memory location identifier to the hardware NIC.

30. The system of claim 29, wherein the one or more processors are further configured to be capable of executing the stored programmed instructions to: receive a notification message by the agent process indicating that the hardware NIC has performed a DMA operation to read the outbound network packet from the buffer; and transmit another notification message by the agent process to the service process indicating that the outbound network packet has been transmitted.

31. A non-transitory computer readable medium having stored thereon instructions comprising executable code that, when executed by one or more processors, causes the processors to: receive metadata about a network packet by an agent process running on a host computer, wherein the metadata about the network packet is received from a hardware network interface controller (NIC) connected to the host computer; identify, by the agent process, a memory buffer of the host computer using the metadata; transmit a direct memory access (DMA) write message by the agent process to the hardware NIC, wherein the DMA write message comprises a memory location identifier associated with the memory buffer; and receive, by the agent process, a notification message from the hardware NIC indicating that the hardware NIC has performed a DMA operation to write the network packet to the memory buffer of the host computer.

32. The non-transitory computer readable medium of claim 31, wherein: the metadata about the network packet comprises an identifier associated with a service process running on the host computer; the identifying the memory buffer of the host computer comprises: transmitting a request for a free memory buffer by the agent process to a virtual NIC interface associated with the service process, and receiving the memory location identifier by the agent process from the virtual NIC interface; and the instructions further comprise executable code that, when executed by one or more processors, causes the processors to transmit a notification message by the agent process to the virtual NIC interface, wherein the notification message indicates that the network packet has been written to the memory buffer.

33. The non-transitory computer readable medium of claim 31, wherein: the metadata about the network packet comprises a tenant identifier; and the instructions further comprise executable code that, when executed by one or more processors, causes the processors to: identify a plurality of service processes running on the host computer that are associated with the tenant identifier, transmit a plurality of requests for free memory buffers to the plurality of service processes, receive a plurality of memory location identifiers, including the memory location identifier, by the agent process from the plurality of service processes, and transmit a plurality of DMA write messages, including the DMA write message, by the agent process to the hardware NIC.

34. The non-transitory computer readable medium of claim 31, wherein the instructions further comprise executable code that, when executed by one or more processors, causes the processors to: receive, by the agent process, a notification message from a service process running on the host computer, wherein the notification message comprises a memory location identifier associated with a buffer comprising an outbound network packet; and transmit, by the agent process, a DMA read message comprising the memory location identifier to the hardware NIC.

35. The non-transitory computer readable medium of claim 34, wherein the instructions further comprise executable code that, when executed by one or more processors, causes the processors to: receive a notification message by the agent process indicating that the hardware NIC has performed a DMA operation to read the outbound network packet from the buffer; and transmit another notification message by the agent process to the service process indicating that the outbound network packet has been transmitted.

36. A network traffic management apparatus, comprising memory comprising programmed instructions stored thereon and one or more processors configured to be capable of executing the stored programmed instructions to: receive metadata about a network packet by an agent process running on a host computer, wherein the metadata about the network packet is received from a hardware network interface controller (NIC) connected to the host computer; identify, by the agent process, a memory buffer of the host computer using the metadata; transmit a direct memory access (DMA) write message by the agent process to the hardware NIC, wherein the DMA write message comprises a memory location identifier associated with the memory buffer; and receive, by the agent process, a notification message from the hardware NIC indicating that the hardware NIC has performed a DMA operation to write the network packet to the memory buffer of the host computer.

37. The network traffic management apparatus of claim 36, wherein: the metadata about the network packet comprises an identifier associated with a service process running on the host computer; the identifying the memory buffer of the host computer comprises: transmitting a request for a free memory buffer by the agent process to a virtual NIC interface associated with the service process, and receiving the memory location identifier by the agent process from the virtual NIC interface; and the one or more processors are further configured to be capable of executing the stored programmed instructions to transmit a notification message by the agent process to the virtual NIC interface, wherein the notification message indicates that the network packet has been written to the memory buffer.

38. The network traffic management apparatus of claim 36, wherein: the metadata about the network packet comprises a tenant identifier; and the one or more processors are further configured to be capable of executing the stored programmed instructions to: identify a plurality of service processes running on the host computer that are associated with the tenant identifier, transmit a plurality of requests for free memory buffers to the plurality of service processes, receive a plurality of memory location identifiers, including the memory location identifier, by the agent process from the plurality of service processes, and transmit a plurality of DMA write messages, including the DMA write message, by the agent process to the hardware NIC.

39. The network traffic management apparatus of claim 36, wherein the one or more processors are further configured to be capable of executing the stored programmed instructions to: receive, by the agent process, a notification message from a service process running on the host computer, wherein the notification message comprises a memory location identifier associated with a buffer comprising an outbound network packet; and transmit, by the agent process, a DMA read message comprising the memory location identifier to the hardware NIC.

40. The network traffic management apparatus of claim 36, wherein the one or more processors are further configured to be capable of executing the stored programmed instructions to: receive a notification message by the agent process indicating that the hardware NIC has performed a DMA operation to read the outbound network packet from the buffer; and transmit another notification message by the agent process to the service process indicating that the outbound network packet has been transmitted.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present, or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together and does not exclude the presence of intermediate elements between the coupled items. The term "and/or" means any one item or combination of items in the phrase.

The recited order of processing elements or sequences, or the use of numbers, letters, or other designations therefore is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system, the method comprising: receiving a network broadcast packet by a hardware network interface controller (NIC) connected to a host computer; transmitting, by the hardware NIC, a request to an agent process running on the host computer to identify a plurality of memory locations in the host computer that should receive the network broadcast packet; receiving, by the hardware NIC, a response from the agent process that comprises a plurality of memory location identifiers associated with the plurality of memory locations in the host computer; and writing, by the hardware NIC, the network broadcast packet to the plurality of memory locations in the host computer that are associated with the plurality of memory location identifiers, wherein the writing comprises performing a plurality of direct memory access (DMA) operations.

2. The method of claim 1, wherein:
the response from the agent process comprises a plurality of DMA descriptors that comprise the plurality of memory location identifiers; and the method further comprises:
identifying, by the agent process, a plurality of service processes based on contents of the request,
transmitting a plurality of requests for available memory buffers, by the agent process, to a plurality of virtual NIC interfaces associated with the plurality of service processes,
receiving, by the agent process, a plurality of responses from the plurality of virtual NIC interfaces, wherein the plurality of responses comprise the plurality of memory location identifiers, and
generating, by the agent process, the plurality of DMA descriptors using the plurality of memory location identifiers.

3. The method of claim 2, wherein:
the request to identify the plurality of memory locations comprises the network broadcast packet.

4. The method of claim 2, wherein:
the request to identify the plurality of memory locations comprises metadata about the network broadcast packet.

5. The method of claim 1, wherein:
the method further comprises identifying, by the hardware NIC, a plurality of service processes that should receive the network broadcast packet based on contents of the network broadcast packet, wherein the plurality of service processes are running on the host computer; and
the request to identify the plurality of memory locations comprises a plurality of service identifiers associated with the plurality of service processes.

6. A system comprising one or more network traffic management modules, networking modules, or server modules, memory comprising programmed instructions stored thereon, and one or more processors configured to be capable of executing the stored programmed instructions to: receive a network broadcast packet by a hardware network interface controller (NIC) connected to a host computer; transmit, by the hardware NIC, a request to an agent process running on the host computer to identify a plurality of memory locations in the host computer that should receive the network broadcast packet; receive, by the hardware NIC, a response from the agent process that comprises a plurality of memory location identifiers associated with the plurality of memory locations in the host computer; and write, by the hardware NIC, the network broadcast packet to the plurality of memory locations in the host computer that are associated with the plurality of memory location identifiers, wherein the writing comprises performing a plurality of direct memory access (DMA) operations.

7. The system of claim 6, wherein:
the response from the agent process comprises a plurality of DMA descriptors that comprise the plurality of memory location identifiers; and
the one or more processors are further configured to be capable of executing the stored programmed instructions to:
identify, by the agent process, a plurality of service processes based on contents of the request,
transmit a plurality of requests for available memory buffers, by the agent process, to a plurality of virtual NIC interfaces associated with the plurality of service processes,
receive, by the agent process, a plurality of responses from the plurality of virtual NIC interfaces, wherein the plurality of responses comprise the plurality of memory location identifiers, and
generate, by the agent process, the plurality of DMA descriptors using the plurality of memory location identifiers.

8. The system of claim 7, wherein:
the request to identify the plurality of memory locations comprises the network broadcast packet.

9. The system of claim 7, wherein:
the request to identify the plurality of memory locations comprises metadata about the network broadcast packet.

10. The system of claim 6, wherein:
the one or more processors are further configured to be capable of executing the stored programmed instructions to identify, by the hardware NIC, a plurality of service processes that should receive the network broadcast packet based on contents of the network broadcast packet, wherein the plurality of service processes are running on the host computer; and
the request to identify the plurality of memory locations comprises a plurality of service identifiers associated with the plurality of service processes.

11. A non-transitory computer readable medium having stored thereon instructions comprising executable code that, when executed by one or more processors, causes the processors to: receive a network broadcast packet by a hardware network interface controller (NIC) connected to a host computer; transmit, by the hardware NIC, a request to an agent process running on the host computer to identify a plurality of memory locations in the host computer that should receive the network broadcast packet; receive, by the hardware NIC, a response from the agent process that comprises a plurality of memory location identifiers associated with the plurality of memory locations in the host computer; and write, by the hardware NIC, the network broadcast packet to the plurality of memory locations in the host computer that are associated with the plurality of memory location identifiers, wherein the writing comprises performing a plurality of direct memory access (DMA) operations.

12. The non-transitory computer readable medium of claim 11, wherein:
the response from the agent process comprises a plurality of DMA descriptors that comprise the plurality of memory location identifiers; and
the instructions further comprise executable code that, when executed by one or more processors, causes the processors to:
identify, by the agent process, a plurality of service processes based on contents of the request,
transmit a plurality of requests for available memory buffers, by the agent process, to a plurality of virtual NIC interfaces associated with the plurality of service processes,
receive, by the agent process, a plurality of responses from the plurality of virtual NIC interfaces, wherein the plurality of responses comprise the plurality of memory location identifiers, and
generate, by the agent process, the plurality of DMA descriptors using the plurality of memory location identifiers.

13. The non-transitory computer readable medium of claim 12, wherein:
the request to identify the plurality of memory locations comprises the network broadcast packet.

14. The non-transitory computer readable medium of claim 12, wherein:
the request to identify the plurality of memory locations comprises metadata about the network broadcast packet.

15. The non-transitory computer readable medium of claim 11, wherein:
the instructions further comprise executable code that, when executed by one or more processors, causes the processors to identify, by the hardware NIC, a plurality of service processes that should receive the network broadcast packet based on contents of the network broadcast packet, wherein the plurality of service processes are running on the host computer; and
the request to identify the plurality of memory locations comprises a plurality of service identifiers associated with the plurality of service processes.

16. A network traffic management apparatus, comprising memory comprising programmed instructions stored thereon and one or more processors configured to be capable of executing the stored programmed instructions to: receive a network broadcast packet by a hardware network interface controller (NIC) connected to a host computer; transmit, by the hardware NIC, a request to an agent process running on the host computer to identify a plurality of memory locations in the host computer that should receive the network broadcast packet; receive, by the hardware NIC, a response from the agent process that comprises a plurality of memory location identifiers associated with the plurality of memory locations in the host computer; and write, by the hardware NIC, the network broadcast packet to the plurality of memory locations in the host computer that are associated with the plurality of memory location identifiers, wherein the writing comprises performing a plurality of direct memory access (DMA) operations.

17. The network traffic management apparatus of claim 16, wherein:
the response from the agent process comprises a plurality of DMA descriptors that comprise the plurality of memory location identifiers; and
the one or more processors are further configured to be capable of executing the stored programmed instructions to:
identify, by the agent process, a plurality of service processes based on contents of the request,
transmit a plurality of requests for available memory buffers, by the agent process, to a plurality of virtual NIC interfaces associated with the plurality of service processes,
receive, by the agent process, a plurality of responses from the plurality of virtual NIC interfaces, wherein the plurality of responses comprise the plurality of memory location identifiers, and
generate, by the agent process, the plurality of DMA descriptors using the plurality of memory location identifiers.

18. The network traffic management apparatus of claim 17, wherein:
the request to identify the plurality of memory locations comprises the network broadcast packet.

19. The network traffic management apparatus of claim 17, wherein:
the request to identify the plurality of memory locations comprises metadata about the network broadcast packet.

20. The network traffic management apparatus of claim 16, wherein:
the one or more processors are further configured to be capable of executing the stored programmed instructions to identify, by the hardware NIC, a plurality of service processes that should receive the network broadcast packet based on contents of the network broadcast packet, wherein the plurality of service processes are running on the host computer, and the request to identify the plurality of memory locations comprises a plurality of service identifiers associated with the plurality of service processes.

* * * * *